US008661544B2

(12) United States Patent
Yen et al.

(10) Patent No.: US 8,661,544 B2
(45) Date of Patent: Feb. 25, 2014

(54) DETECTING BOTNETS

(75) Inventors: Chui-Tin Yen, San Jose, CA (US); Saumyavapuh Lugani, San Jose, CA (US); Snigdhendu Mukhopadhyay, San Jose, CA (US); Kuntal Daftary, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 240 days.

(21) Appl. No.: 12/873,048

(22) Filed: Aug. 31, 2010

(65) Prior Publication Data
US 2012/0054869 A1 Mar. 1, 2012

(51) Int. Cl.
*H04L 29/06* (2006.01)

(52) U.S. Cl.
USPC .......................................................... 726/24

(58) Field of Classification Search
USPC .......................................................... 726/24
See application file for complete search history.

(56) References Cited

U.S. PATENT DOCUMENTS

| 5,850,470 | A * | 12/1998 | Kung et al. ................ 382/157 |
| 7,051,089 | B1 * | 5/2006 | Johnson et al. ............ 709/220 |
| 7,854,001 | B1 * | 12/2010 | Chen et al. ................. 726/24 |
| 8,006,305 | B2 * | 8/2011 | Aziz .......................... 726/24 |
| 8,149,841 | B2 * | 4/2012 | Moore et al. .............. 370/394 |
| 8,171,413 | B2 * | 5/2012 | McLaughlin et al. ..... 715/734 |
| 8,171,553 | B2 * | 5/2012 | Aziz et al. ................. 726/24 |
| 8,205,258 | B1 * | 6/2012 | Chang et al. .............. 726/22 |
| 8,260,914 | B1 * | 9/2012 | Ranjan ...................... 709/224 |
| 8,490,171 | B2 * | 7/2013 | Harrison et al. ........... 726/12 |
| 2005/0256935 | A1 * | 11/2005 | Overstreet et al. ........ 709/208 |
| 2006/0126611 | A1 * | 6/2006 | Kelly et al. ................ 370/389 |
| 2008/0028463 | A1 * | 1/2008 | Dagon et al. .............. 726/22 |
| 2008/0080398 | A1 * | 4/2008 | Yasuie et al. .............. 370/254 |
| 2009/0254833 | A1 * | 10/2009 | McLaughlin et al. ..... 715/736 |
| 2010/0002704 | A1 * | 1/2010 | Moore et al. .............. 370/394 |
| 2010/0235915 | A1 * | 9/2010 | Memon et al. ............. 726/23 |
| 2011/0185425 | A1 * | 7/2011 | Lee et al. .................. 726/23 |
| 2012/0042381 | A1 * | 2/2012 | Antonakakis et al. ..... 726/22 |

FOREIGN PATENT DOCUMENTS

WO WO2009/155453 A1 12/2009

OTHER PUBLICATIONS

Wikipedia, "Fast FLUX", website, http://en.wikipedia.org/wiki/Fast_flux, last printed Jun. 16, 2011, 1 page.
Atlas, "Atlas Summary Report: Global Fast Flux", website, http://atlas.arbor.net/summary/fastflux, last printed Jun. 16, 2011, 3 pages.
Cisco Systems Inc., "Botnet Detection Using dASE Intrastructure", IOS Botnet Defense Team, 2006, 11 pages.
European Patent Office, International Search Report and written opinion received in PCT Application No. PCT/US11/47992 dated Nov. 23, 2011 (5 pages).
Current Claims, PCT Application No. PCT/US11/47992 (5 pages).

(Continued)

*Primary Examiner* — David García Cervetti
(74) *Attorney, Agent, or Firm* — Hickman Palermo Truong Becker Bingham Wong LLP

(57) ABSTRACT

A method is disclosed for distributed detection of botnets via a plurality of sensors on a network. According to embodiments, DNS information, including domain names and addresses, is received at a sensor, the number of unique subnets corresponding to a domain name is determined and an alert is sent to other sensors when the number of unique subnets exceeds a first threshold. Other embodiments are also disclosed.

24 Claims, 4 Drawing Sheets

(56) References Cited

OTHER PUBLICATIONS

Thorsten Holz et al., entitled "Measuring and Detecting Fast-Flux Service Networks" dated Feb. 11, 2008. (12 pages).

Passerini et al., "FluXOR: Detecting and Monitoring Fast-Flux Service Networks", Dated 2008, 22 pages.

Perdisci et al."Detecting Malicious Flux Service Networks through Passive Analysis of Recursive DNS Traces", IEEE, dated 2009, 10 pages.

* cited by examiner

DETECTING BOTNETS

TECHNICAL FIELD

The present disclosure generally relates to network security and detection of malicious websites.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

A botnet is a collection of software agents distributed on networked devices under the control of an originating server. The originating server may belong to a malicious website or network resource that distributes malware such as viruses, spyware or other undesirable software programs. Often the bots, e.g. the software agents, that comprise the botnet are running undetected on compromised computers. For example, the owner of a personal computer may have a bot running on the computer and owner may not know that the bot exists. Moreover, the bot may allow someone other that the owner of the computer to control functions of the computer. For example, the bot may be programmed to send out e-mails, e.g. spam, to other devices. Additionally, the bot may be programmed to propagate computer viruses, make available backdoors, or participate in a denial of service attack on other devices. The botnet controller server may be programmed to coordinate a collection of bots, e.g. the botnet, to perform a denial of service attack, among other malicious activities. Botnets are frequently used for hosting server applications, such as web servers, file servers, application servers and other server types, that are controlled by an originating server and therefore may use fast flux to avoid detection.

Fast flux is a domain name system (DNS) technique used by botnets to hide phishing and malware delivery web-sites behind an ever-changing network of compromised hosts that are acting as proxies for the phishing or malware delivery web-sites. Fast flux can also refer to the combination of peer-to-peer networking, distributed command and control, web-based load balancing and proxy redirection that are used to make malware networks more resistant to discovery by network security mechanisms and the counter-measures employed by network security mechanisms.

There are at least two different types of fast flux techniques: single-flux and double-flux. Single-flux is characterized by multiple individual nodes within the network registering and de-registering their internet protocol (IP) addresses as part of the DNS address (DNS A) record list for a single DNS name. The single-flux variation combines round-robin DNS registration with very short time to live (TTL) values to create a constantly changing list of destination IP addresses for a single DNS name. Double-flux is characterized by multiple nodes within the network registering and de-registering their IP addresses as part of the DNS name server (DNS NS) record list for the DNS zone. Hence, double-flux provides an additional layer of redundancy and survivability within a malware network.

Within a malware attack the DNS records may point to a compromised system, e.g., a bot, that is acting as a proxy for a malicious website. Thus, the DNS records may contain the IP addresses of network devices on which various bots reside that are acting on behalf of the malicious website instead of containing the IP address of the malicious website itself. This technique may prevent some of the traditionally best defense mechanisms from working such as IP address-based access control lists (ACL). Further, the technique may also be used to hide the attacker's systems, which may exploit the network through a series of proxies, e.g. bots, and make it much more difficult to identify the attacker's network. For example, the DNS record may point to an IP address where bots go for registration, to receive instructions, or to activate attacks instead of identifying the IP address of the attacker.

DETAILED DESCRIPTION

Figure 1:
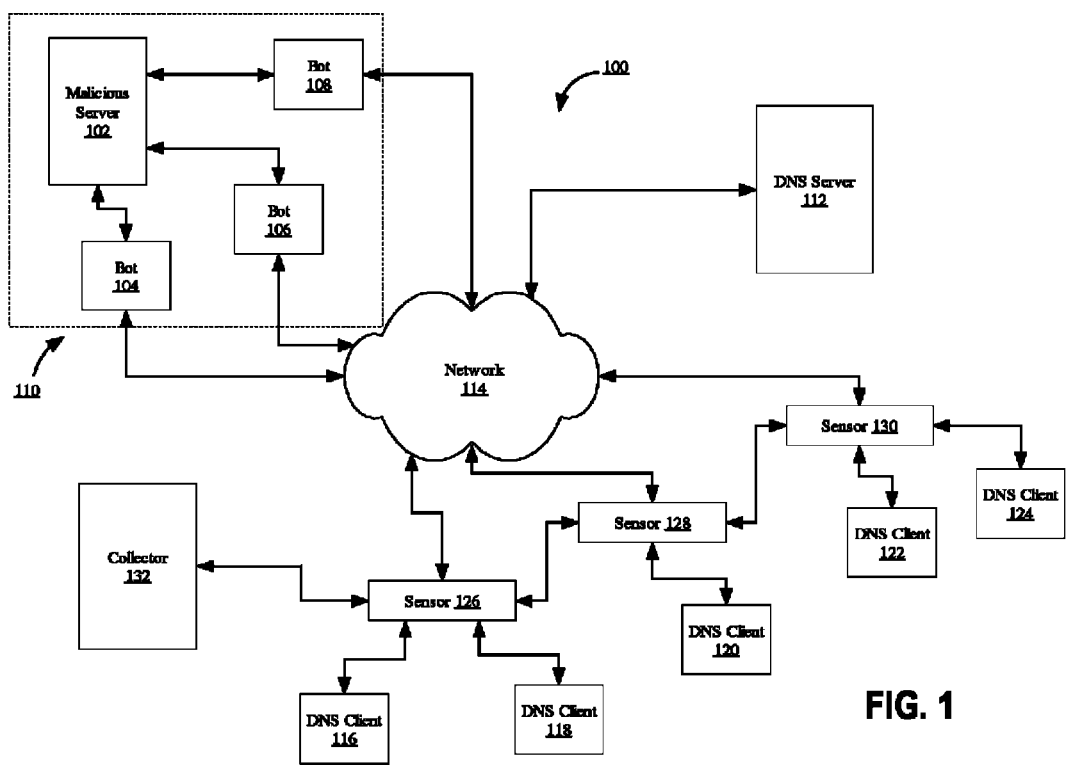
FIG. 1 illustrates a network computer system upon which embodiments may be implemented.

Detecting botnets is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Detecting Botnets
3.1 Detecting Malicious Websites
3.2 Distribution of DNS Information
4.0 Implementation Mechanisms—Hardware Overview
5.0 Extensions and Alternatives
1.0 General Overview Detecting botnets is described. In an embodiment, a first sensor may receive domain name system (DNS) server information that includes one or more internet protocol (IP) addresses corresponding to a domain name. Based on the IP addresses, it may be determined how many unique subnets correspond to the domain name. If the determined number of unique subnets exceeds a distribution threshold, a suspicious domain name alert that includes the DNS information may be sent to one or more other sensors.

In some embodiments, a first sensor may receive DNS information that includes one or more IP addresses corresponding to a domain name. Based in the IP addresses, it may be determined how many unique subnets correspond to the domain name. If the determined number of unique subnets exceeds a detection threshold, a detected botnet alert that identifies the domain name as corresponding to a malicious entity may be sent to one or more computing devices. In an embodiment, the distribution threshold may be less than the detection threshold. Embodiments may include receiving at least part of the DNS information from one or more other sensors.

According to embodiments, a subnet mask may be applied to one or more IP addresses corresponding to a domain name to generate one or more subnet identifiers and the number of subnets corresponding to the domain name may be determined based on the generated subnet identifiers. In an embodiment, the number of unique subnets may be determined by performing a hash operation on the one or more subnet identifiers. An embodiment may also include storing the DNS information in a database, retrieving DNS information from the database, and determining the number of unique subnets corresponding to a domain name based on one or more stored IP addresses retrieved from the DNS information database.

Embodiments may also include intercepting, at a sensor, one or more DNS records sent from a DNS server to a DNS client device, parsing the DNS records to determine one or more IP addresses corresponding to the domain name and sending the one or more DNS packets to the DNS client device. In some embodiments, the sensors disclosed herein may be a router or a switch.

In other embodiments, the invention encompasses a computer apparatus and a computer-readable medium configured to carry out the foregoing steps.

2.0 Structural and Functional Overview

FIG. 1 illustrates a network computer system upon which embodiments may be implemented. For example, the network system 100 of FIG. 1 may include a malicious server 102 that controls bots 104, 106 and 108. Malicious server 102 may be the source or originator of a malicious or harmful website that may download viruses, spyware or other harmful software onto devices on a network. Malicious server 102 may cause software or other computer instructions to be installed on other devices on a network to serve as proxy hosts for the website originated from malicious server 102. Bots 104-108 may serve as proxies that host a malicious websites for malicious server 102. Collectively, bots 104-108 and malicious server 102 may form botnet 110.

Botnet 110 may be connected to DNS server 112 through network 114. DNS server 112 may implement a name-service protocol that associates information with domain names assigned to resources connected to network 114. For example, DNS server 112 may associate IP addresses of devices connected to the network with domain names. Bot 104, 106 or 108 may register an association between an IP address that identifies the bot's host device and a domain name with DNS server 112. For example, malicious server 102 may correspond to the domain name "BadWebsite.com." Access to BadWebsite.com may be available by proxy through bots 104, 106 and 108. The devices hosting bots 104, 106 and 108 may have, for example, IP addresses 104.104.104.104, 106.106.106.106 and 108.108.108.108, respectively. Thus, bot 104, 106 and 108 may each register their respective IP addresses, 104.104.104.104, 106.106.106.106 and 108.108.108.108, with DNS server 112 as being associated with the domain name BadWebsite.com.

DNS clients 116-124 may query DNS server 112 to look up IP addresses corresponding to domain names. For example, a DNS client may want to resolve the domain name "www.cnn.com" to an IP address of a device that is hosting the website for www.cnn.com. The DNS client may provide the domain name to DNS server 112 and the DNS server may return one or more IP addresses corresponding to the domain name. Any requested domain name may have multiple IP addresses across multiple subnets. The IP addresses may be sent to a DNS client in one or more DNS response packets containing DNS A records, for example.

In some embodiments, DNS clients 116-124 may query DNS server 112 to look up IP addresses corresponding to domain name servers. For example, botnet 110 may include one or more DNS servers (not shown). The botnet DNS servers may be employed in the double-flux fast flux variation described above. The botnet DNS servers may register and de-register their addresses with DNS server 112 as part of the DNS Name Server (NS) record list for a DNS zone. The IP address for a domain name server requested by one or more of DNS clients 116-124 may be sent to one of the DNS clients in one or more DNS response packets containing DNS NS records.

DNS clients 116-124 may access DNS server 112 through network 114 via sensor 126, 128 or 130. Sensors 126, 128 and 130 may be routers or switches through which DNS clients 116-124 access network 114 and connect to DNS server 112. In an embodiment, sensors 126, 128 and 130 may intercept and analyze DNS packets as they are transmitted between DNS server 112 and DNS clients 116-124. For example, the sensors may receive DNS packets containing DNS information (DNS A or DNS NS records). The DNS information may contain IP addresses corresponding to one or more domain names. The sensors may analyze the IP addresses to determine how many unique subnets are associated with the IP addresses and alert other devices if the number of unique subnets exceeds a distribution threshold or a detection threshold. For example, if the number of unique subnets associated with a domain name exceeds the distribution threshold, the DNS information associated with the domain name may be distributed to other sensors on the network to be used to identify domain names as belonging to botnets or malicious websites. If the number of unique subnets associated with a domain name exceeds the detection threshold, a domain name belonging to a botnet or malicious website may be detected. The detected botnet domain name may be identified to sensors on the network as belonging to a botnet, e.g., botnet 110, and the sensors may intercept and prevent the DNS response information associated with the botnet from being transmitted to the requesting DNS client. Thus, embodiments may prevent DNS clients 116-124 from getting infected or controlled by malicious server 102 or its minions, e.g. bots 104-108.

In some embodiments, collector 132 may collect DNS information, alerts, or other information received from sensors 126, 128, and 130. In an embodiment, collector 132 may participate in distributing information among the sensors. For example, collector 132 may receive a detected botnet alert message from one or more of sensors 126, 128 and 130 and compare DNS information received in the alert to a white list of known safe domain names and IP addresses. If the DNS information matches any of the white listed domains or IP addresses, collector 132 may transmit one or more messages to the sensors that identify the white listed domain names or IP addresses as safe. In some embodiments, each sensor may store a white list and compare identified domain names to the white listed domain names as part of the botnet detection process. Thus, DNS traffic that includes domain names and addresses that are known to be safe will not be prevented from reaching DNS clients, as disclosed in further detail below.

In an embodiment, collector 132 may also be configured with a user interface. For example, collector 132 may allow a user to view DNS information received from sensors 126, 128 and 130. Collector 132 may display information such as alerts, DNS records, identified malicious websites and white listed domains and IP addresses. Collector 132 may also allow a user to identify malicious domain names and IP addresses. For example, collector 132 may display DNS information to a user, the user may view and analyze the displayed information and provide input to collector 132 identifying a domain name in the DNS information as belonging to a malicious website. Additionally, collector 132 may display a list of identified malicious websites and allow a user to provide input to identify a malicious website or domain name as not malicious. In response to the user identifying a domain name as malicious or not malicious, collector 132 may send one or more messages to sensors 126, 128 and 132 that identify the domain name as malicious or not malicious based on user input. The sensors may process subsequent DNS response packets according to the new status assigned to the domain name by transmitting or not transmitting the DNS information to DNS clients.

3.0 Detecting Botnets

Websites hosted by botnets may exhibit fast flux. For example, the DNS records for these websites may display an ever-changing list of web servers. Fast flux may also be used for some legitimate applications, such as load balancing. Embodiments disclosed herein may be able to distinguish between legitimate load balancers and botnets. According to embodiments, to distinguish legitimate load balancers from botnet hosted websites, the similarity in the IP addresses associated with a domain name returned in a DNS response packet may be determined. For example, if the IP addresses associated with a domain name are very similar to each other, they are most likely coming from an intermediate load balancer because legitimate organizations employing these techniques usually have limited IP address space. Botnets, however, may be a list of compromised hosts over different internet service providers (ISPs) and different address spaces. Since bots within a botnet do not belong to an organization with limited address space and may be deployed in a varied IP address space, the addresses for each bot associated with a domain name may be very different. Thus, botnets may be discovered by analyzing the dispersion of IP addresses associated with a domain name.

Embodiments disclosed herein describe detecting botnets based on the dissimilarity between received IP addresses corresponding to a domain. While specific embodiments may disclose determining IP address dissimilarity based on subnets of IP addresses, other methods of determining IP address dissimilarity may be used. For example, IP address masking may be performed to determine IP address dissimilarity based on a portion of an IP address that does not correspond to a subnet. Other methods for determining IP address dissimilarity may also be used.

Figure 2:
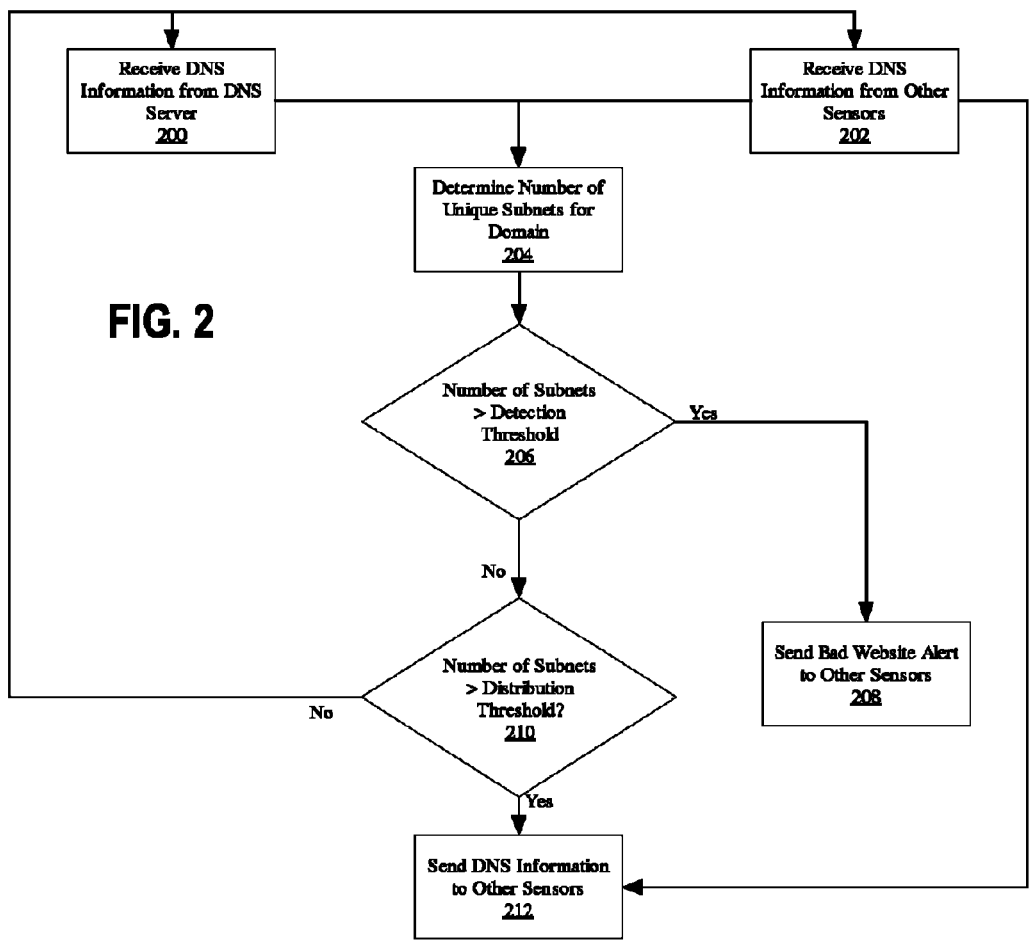
FIG. 2 illustrates a method for detecting botnets, according to embodiments.

FIG. 2 illustrates a method for detecting botnets, according to embodiments. According to an embodiment, DNS information containing IP addresses associated with domain names may be received, a number indicating the number of unique subnets corresponding to a domain name may be determined and a detected botnet alert may be sent to other devices when the number of unique subnets that correspond to a domain name exceeds a detection threshold. In some embodiments, a suspicious domain name alert containing the DNS information for a domain name may be sent to other devices on a network when the number of unique subnets associated with a domain name exceeds a distribution threshold. Other embodiments are also described.

At step 200, DNS information may be received from a DNS server, according to embodiments. For example, network traffic between a DNS client and a DNS server may be transmitted through a router or a switch on a network. The router or switch may host a botnet detection sensor that may examine DNS packets transmitted between the DNS client and DNS server. According to some embodiments, the DNS information may include DNS A records containing IP addresses and domain names such as those listed in TABLE 1 and TABLE 2.

TABLE 1

| |
| --- |
| cnn.com. 223 IN A 157.166.226.25 |
| cnn.com. 223 IN A 157.166.226.26 |
| cnn.com. 223 IN A 157.166.224.25 |
| cnn.com. 223 IN A 157.166.224.26 |

For example, TABLE 1 lists DNS information that may be received in a DNS response packet in response to a DNS client requesting DNS information about cnn.com. TABLE 2 lists DNS information that may be received in a DNS response packet in response to a DNS client requesting DNS information about tagstop100.cn, for example.

TABLE 2

| |
| --- |
| tagstop100.cn. 300 IN A 200.6.158.80 |
| tagstop100.cn. 300 IN A 200.88.48.182 |
| tagstop100.cn. 300 IN A 200.201.193.194 |
| tagstop100.cn. 300 IN A 208.234.59.72 |
| tagstop100.cn. 300 IN A 66.188.48.158 |
| tagstop100.cn. 300 IN A 67.210.77.55 |
| tagstop100.cn. 300 IN A 116.48.139.96 |

According to an embodiment, the DNS information may include DNS NS records containing IP addresses and domain names. Thus, according to embodiments, a botnet detection sensor may receive DNS information from a DNS server as the information is being routed or transmitted to a DNS client.

At step 202, DNS information may be received from one or more other botnet detection sensors, according to embodiments. For example, a plurality of botnet detection sensors may be deployed on a network and hosted by a plurality of network devices, such as routers or switches. According to embodiments, each of the botnet detection sensors may be configured to transmit DNS information to other botnet detection sensors on the network, as discussed further below. Thus, according to embodiments, a botnet detection sensor may receive DNS information from one or more other botnet detection sensors.

According to embodiments, step 200 and 202 may include storing the received DNS information. For example, newly received DNS information may be stored in a DNS information database along with previously received DNS information. Thus, embodiments may determine the number of unique subnets associated with a domain name based on both newly received DNS information and previously received DNS information, as discussed further below.

At step 204, the number of unique subnets corresponding to a domain name may be determined. For example, after the DNS information is received at step 200 or 202, the DNS information may be analyzed to determine a list of IP addresses associated with a domain name identified in the DNS information. The DNS information may include one or more domain names and one or more IP addresses associated with each domain name. According to embodiments, the IP address information may include IP addresses that conform to the IPv4 standard. According to an embodiment, the IP address information in the DNS information may include IP addresses that conform to the IPv6 standard.

Further at step 204, a mask may be applied to the list of IP addresses associated with a particular domain name in order to determine a subnet for each IP address. For example, a subnet mask may be applied to each IP address associated with a domain name to generate a list of subnets associated with the domain name.

For example, TABLE 3 and TABLE 4 below illustrate masking the least significant half of each received IP address for domain names cnn.com and tagstop100.cn. According to an embodiment, after determining a subnet for each IP address associated with a domain name, the number of unique subnets associated with the domain name may be determined.

TABLE 3 cnn.com. 223 IN A 157.166.xxx.xxx
cnn.com. 223 IN A 157.166.xxx.xxx
cnn.com. 223 IN A 157.166.xxx.xxx
cnn.com. 223 IN A 157.166.xxx.xxx For example, after masking the IP addresses associated with cnn.com in TABLE 3 above, it becomes clear that the domain name cnn.com is associated with only one subnet and, therefore, may be determined to belong to a legitimate website, as disclosed further below.

TABLE 4 tagstop100.cn. 300 IN A 200.6.xxx.xxx
tagstop100.cn. 300 IN A 200.88.xxx.xxx
tagstop100.cn. 300 IN A 200.201.xxx.xxx
tagstop100.cn. 300 IN A 208.234.xxx.xxx
tagstop100.cn. 300 IN A 66.188.xxx.xxx
tagstop100.cn. 300 IN A 67.210.xxx.xxx
tagstop100.cn. 300 IN A 116.48.xxx.xxx In contrast and as illustrated by TABLE 4, once the IP addresses associated with tagstop100.cn are masked, the domain name tagstop100.cn appears to be associated with at least seven different subnets and, therefore, may be determined to belong to a malware website, as disclosed further below. According to some embodiments, a hash function may be applied to the list of subnet identifiers associated with a domain name in order to determine the number of unique subnets associated with the domain name.

In an embodiment, subnet identifiers may be hashed into a bitmap in order to determine how many subnets correspond to a particular domain name. For example, the bitmap may act as a bloom filter for all addresses belonging to a particular domain name. Using a bitmap may save space when storing multiple IP addresses for a domain name and may also speed up the comparison of IP addresses and IP subnets. For example, if the domain name badhost.baddomain.com is associated with IP addresses 123.33.44.55, 44.33.22.33, 44.55.33.22, 66.43.23.4, 83.22.4.55, the IP addresses may be hashed into a 64-bit bitmap. Each IP address may be hashed into one bit location and multiple addresses may hash into the same bit. For example, five IP addresses may be hashed into four bits with two of the IP addresses being hashed into the same bit. Thus, hashing IP addresses into a bitmap may save space when there are hundreds of IP addresses to analyze. The relatively small size of the bitmap may allow the bitmap to be easily and efficiently distributed to other sensors on the network where the bitmap may be used by the other sensors to determine the number of unique subnets associated with a domain name. The bitmap may also provide a fast lookup and comparison mechanism for IP addresses. For example, determining if an IP address or subnet is new may be accomplished by merely hashing the IP address and comparing the IP address hash value with the bitmap. If the hashed IP address value falls into a previously unoccupied bit, the IP address may be identified as a new IP address. The bitmap may also provide an efficient mechanism to estimate the number of unique IP addresses or subnets by simply counting the number of bits in the bitmap.

According to embodiments, step 204 may also include retrieving stored DNS information and determining the number of unique subnets associated with a domain name based on previously stored DNS information and newly received DNS information. For example, over time a botnet may register and deregister IP addresses associated with a domain name. However, at any particular time a botnet may only have a small number of IP addresses associated with a domain name. Thus, if IP addresses are analyzed to determine the number of unique subnets associated with a domain name based only on DNS information received at a particular time, only a small number of unique subnets may be identified and counted.

However, by storing the DNS information over time, when the DNS information is received from a DNS server or other sensors, the stored information and newly received DNS information may be analyzed to determine the number of unique subnets associated with a domain name. Thus, if over time the botnet has been registering and deregistering IP addresses associated with a domain name, the previously registered IP addresses associated with the domain name may be included in the number of unique subnets determined according to embodiments disclosed herein. Accordingly, embodiments disclosed herein may detect a botnet or malicious website based on DNS information received from a DNS server, DNS information received from one or more other sensors, or DNS information received from a DNS server and received from other sensors.

3.1 Detecting Malicious Websites

At step 206, embodiments may determine whether the number of unique subnets associated with a domain name exceeds a detection threshold. For example, the detection threshold may indicate a number of unique subnets. According to embodiments, when the number of unique subnets associated with a domain name exceeds the detection threshold, the domain name may be identified as belonging to a malicious entity such as a botnet or a malicious website. For example, if the detection threshold is six (6) and seven (7) unique subnets associated with a domain name have been identified, then the domain name may be identified as belonging to a botnet and/or a malicious website.

According to some embodiments, when a malicious entity domain name has been identified, the domain name may be compared to a whitelist of known safe domain names. For example, the whitelist may include domain names or addresses of known safe websites and domains. According to an embodiment, if the identified botnet domain name is found in the whitelist, the domain name may be treated as a safe domain name and not be dropped from subsequent DNS network traffic, as disclosed below. In an embodiment, a domain name and/or IP address that has been identified as belonging to a malicious website or botnet may be added to a blacklist of malicious domain names and/or IP addresses. For example, the domain names of received IP addresses may be compared to the domain names in the blacklist to determine whether the domain name is known to belong to a malicious website. If the domain name matches a blacklisted domain name, communications with the blacklisted domain name may be blocked.

At step 208, a detected botnet alert may be sent to other sensors on the network that identifies the domain name as belonging to a malicious entity, such as a botnet or malicious website. For example, if the number of unique subnets associated with a domain name exceeds the detection threshold and the domain name is not identified in a white list, as discussed with respect to step 206, a detected botnet alert may be sent to other devices on the network. The detected botnet alert may include the domain name of the botnet, the IP addresses associated with the domain name, an identifier for the sensor that detected the botnet, an IP address of the DNS client that requested the DNS information, or any combination thereof. According to embodiments, the detected botnet alert may be sent to other botnet detection sensors on the network. In some embodiments, the detected botnet alert may be sent to a terminal or other device, such as collector 132, that may allow a user to view the alert and provide input that allows the user to manage sensors, DNS information and alerts received from the sensors on the network. For example, through collector 132 a user may be able to cancel the detected botnet alert if the user determines that the alert was sent in error.

According to embodiments, when a sensor has identified a domain name as belonging to a botnet or malicious website or when a detection alert that identifies a domain name as belonging to a botnet or malicious website, DNS traffic associated with the identified domain name may be dropped. For example, if a domain name has been identified as belonging to a botnet or malicious website, DNS packets that contain DNS information about the identified domain name and are transmitted between a DNS server and a DNS client through a botnet detection sensor may be dropped at the sensor if the sensor has received or originated a detected botnet alert; the DNS packet may not be transmitted further towards the DNS client or DNS server. Embodiments described herein may be performed by any network element and are not limited to a specific type of device for performing this functionality. For example, routers, gateways, switches and other network elements may be configured to identify a domain name as belonging to a botnet or malicious website and to drop, filter or otherwise control the flow of DNS packets containing DNS information associated with an identified botnet domain name.

3.2 Distribution of DNS Information

At step 210, embodiments may determine whether the number of unique subnets associated with a domain name exceeds a distribution threshold. For example, if the number of subnets corresponding to a domain name, as determined at step 204, is not big enough to trigger sending a detected botnet alert, the number of subnets may still be big enough that the domain name may be considered suspect. In an embodiment, a domain name may be identified as a suspected botnet domain name if the number of subnets associated with the domain name exceeds a distribution threshold but is less than the detection threshold.

For example, the detection threshold of subnets may be ten subnets for a domain name. Thus, if the number of unique subnets for a particular domain name is over ten, the particular domain name may be identified as a botnet domain name. Similarly, the distribution threshold of subnets may be six unique subnets for a domain name. Thus, if the number of unique subnets for a particular domain name is greater than six but less than ten (the detection threshold), the particular domain name may be considered suspect and the DNS information associated with the particular domain name may be distributed to other sensors on the network. The threshold numbers used in the examples above are merely exemplary. The detection threshold and the distribution threshold could be configured to be any number. However, in some embodiments the detection threshold may be greater than the distribution threshold.

Moreover, in an embodiment, if the detection threshold is exceeded, the number of unique subnets for a domain may not be compared to the distribution threshold. For example, if a botnet has been detected, there may be no need to distribute the DNS information for the botnet in order to detect the botnet at other sensors since the botnet has already been detected and a detected botnet alert has already been generated and sent to the other sensors.

According to an embodiment, a sensor may request DNS information for a suspect domain name from a DNS server. For example, one or more of the sensors may generate DNS requests for DNS information about a suspect domain name. If, for example, a sensor has determined that the number of subnets associated with a domain name has exceeded the distribution threshold or if a suspicious domain name alert has been received because an other sensor has identified a suspicious domain name, the sensors may query the DNS server to receive DNS information associated with the suspect domain name. In some embodiments, the sensors may repeatedly request DNS information pertaining to a suspect domain name in order to increase the amount of DNS information that can be used for botnet detection. For example, a botnet may register different IP addresses associated with a domain name over time. By repeatedly requesting DNS information associated with the domain name, the sensors may be able to obtain the different IP addresses and identify the domain name as belonging to a malicious entity, such as a botnet or malicious website, without having to wait to intercept subsequent DNS client requests.

At step 212, DNS information for a suspected domain may be sent to other sensors. For example, if the number of unique subnets for a particular domain name exceeds the distribution threshold, the domain name may be suspected of belonging to a botnet or a malicious website. If the domain name is suspect, the DNS information associated with the domain name may be distributed to other sensors so that the other sensors may add the sent DNS information to the DNS information stored at the other sensors and determine whether the domain belongs to a botnet or malicious website based on DNS information collected from all of the sensors on the network. Thus, embodiments disclosed herein may provide for a plurality of distributed sensors capable of sharing DNS information about suspected domain names and identifying botnet domain names based on information received from other sensors on the network.

Moreover, even though a sensor may receive only a single DNS response packet for a domain name, the sensor may still participate in identifying botnets by distributing the DNS information from the single DNS response packet to other sensors. According to embodiments, when a botnet has been identified, information identifying the botnet, e.g., domain names and IP addresses, may be distributed among the sensors so that each sensor may monitor network traffic, including DNS packets, and drop packets associated with the botnet domain name. In some embodiments, instead of dropping DNS packets associated with the botnet domain name, a sensor may cause a message to be displayed at a DNS client that warns a user of the DNS client that the domain name belongs to a suspected botnet or malicious website.

In some embodiments, when DNS information is received from other sensors, DNS information pertaining to the domain name received in the DNS information from the other sensors may be sent without determining a number of unique subnets and without comparing the number of unique subnets to the detection and distribution thresholds. For example, the receipt of a suspicious domain name alert may cause a sensor to identify DNS information stored at the sensor that pertains to the domain name identified in the alert and transmit the stored DNS information to other sensors on the network without comparing the DNS information to the detection and distribution thresholds before sending the information. In an embodiment, after sending DNS information to other sensors in response to receiving a suspicious domain name alert, the DNS information received in the alert may be aggregated with the stored DNS information for the suspect domain name and the aggregated information may be compared to the detection threshold to determine whether the suspect domain name belongs to a botnet or malicious website. Thus, even though the first encounter with a website or domain name may occur at a particular sensor in the network, detecting that the domain name belongs to a botnet or malicious website may occur at a different sensor in the network.

According to embodiments, if the number of unique subnets associated with a domain name does not exceed the detection threshold at step 206 and does not exceed the distribution threshold at step 210, then additional DNS information may be received at steps 200 or 202. For example, because no botnet domain name has been detected and no domain name has been identified as a suspected botnet domain name, a sensor that implements the method of FIG. 2 may continue to monitor network traffic for DNS packets and receive DNS information from DNS servers or other sensors on the network, as disclosed above with respect to steps 200 and 202.

Figure 3:
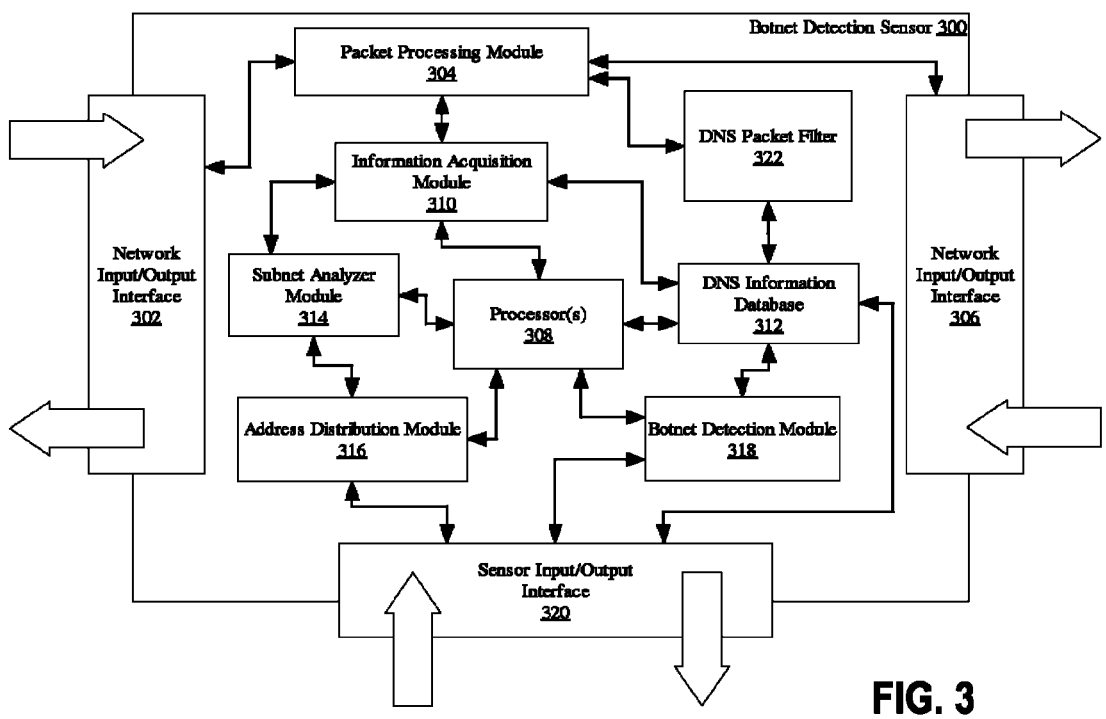
FIG. 3 illustrates an apparatus for detecting botnets, according to embodiments.

FIG. 3 illustrates an apparatus for detecting botnets, according to embodiments. Botnet detection sensor 300 may include a network interface 302, a packet processing module 304 and network interface 306. In an embodiment, botnet detection sensor 300 may be a router or a switch on a network. For example, the combination of network interface 302, packet processing module 304 and network interface 306 may provide packet routing or packet switching capabilities at botnet detection sensor 300. Network interface 302 may be a network facing interface and network interface 306 may be a terminal interface, for example. In an embodiment, packet processing module 304 may be configured to route or switch packets through botnet detection sensor 300.

Botnet detection sensor 300 may include one or more processors 308, information acquisition module 310, DNS information database 312, subnet analyzer module 314, address distribution module 316, botnet detection module 318 and sensor interface 320. Information acquisition module 310 may be configured to acquire DNS information from DNS packets transmitted through botnet detection sensor via network interface 302, packet processing module 304 and network interface 306. Information acquisition model may parse DNS packets and extract DNS information such as domain names, IP addresses corresponding to domain names, DNS server identifiers and DNS client identifiers. In an embodiment, information acquisition module 310 may be configured to store DNS information extracted from DNS packets in DNS information database 312.

In an embodiment, information acquisition module 310 may be configured to query DNS servers to obtain DNS information associated with a domain name. For example, one or more botnet detection sensors may generate DNS requests for DNS information about a suspect domain name. If, for example, a sensor has determined that the number of subnets associated with a domain name has exceeded the distribution threshold or if a suspicious domain name alert has been received because an other sensor has identified a suspicious domain name, the information acquisition module 310 may query the DNS server to receive DNS information associated with the suspect domain name. In some embodiments, the DNS information acquisition module 310 may repeatedly request DNS information pertaining to a suspect domain name in order to increase the amount of DNS information that can be used for botnet detection. For example, a botnet may register different IP addresses associated with a domain name over time. By repeatedly requesting DNS information associated with the domain name, the sensors may be able to obtain the different IP addresses and identify the domain name as belonging to a malicious entity, such as a botnet or malicious website, without having to wait to intercept subsequent DNS client requests.

In an embodiment, DNS information database 312 may be configured to store DNS information including domain names, DNS server identifiers, DNS client identifiers and IP addresses associated with domain names. In an embodiment, DNS information database 312 may store DNS information received from DNS server. In some embodiments, DNS information database 312 may store DNS information received from other sensors via sensor interface 320.

In some embodiments, DNS information database 312 may store alert information received at or sent from botnet detection sensor 300. For example, when sensor 300 detects a botnet according to embodiments described herein, sensor 300 may send a detected botnet alert to other sensors on the network and store the alert in DNS information database 312. Thus, when other modules in sensor 300, such as DNS packet filter 322, need to know which domain names correspond to detected botnets or malicious websites, DNS information database may be queried to retrieve a list of botnet domain names.

In an embodiment, subnet analyzer module 314 may receive domain names and IP addresses from information acquisition module 310 in order to determine a number indicating a quantity of unique subnets associated with a domain. For example, information acquisition module 310 may send DNS information extracted from DNS records in DNS packets to subnet analyzer module 314. In an embodiment, subnet analyzer module 314 may determine the number of unique subnets associated with a domain name. Subnet analyzer module 314 may apply a mask, e.g. a subnet mask, to a list of IP addresses associated with a domain name to generate a subnet identifier corresponding to each IP address, according to embodiments. For example, subnet analyzer module 314 may apply a mask to the last 16 bits of each IP address to generate a subnet identifier for each IP address. Masks of other lengths may be used. In an embodiment, after a subnet identifier is determined for each IP address, subnet analyzer module may determine the number of unique subnets from the list of subnet identifiers corresponding to each IP address. In an embodiment, determining the number of unique subnets may involve performing a hash operation on the list of subnet identifiers derived from the list of IP addresses. For example, the subnet identifiers may be hashed into a bitmap in order to determine how many subnets correspond to a particular domain name.

In some embodiments, subnet analyzer module 314 may retrieve domain name and IP address information from DNS information database 312. For example, subnet analyzer module 314 may retrieve from DNS information database 312 DNS information obtained locally via information acquisition module 310 and DNS information obtained from other sensors on the network and received via sensor interface 320. In an embodiment, subnet analyzer module 314 may analyze information obtained locally and information obtained from other sensors to determine the number of unique subnets associated with a domain name. Thus, the ability of botnet detection sensor 300 to detect botnets based on the number of unique subnets associated with a domain name is not limited to locally collected DNS information. Rather, the ability of detection sensor 300 to detect botnets based on the number of unique subnets associated with a domain name may be enhanced by the capability of sensor 300 to collect DNS information from other sensors on the network and perform botnet detection analysis based on an aggregate of DNS information obtained locally and received from other sources.

According to embodiments, address distribution module 316 may be configured to compare a number that identifies the quantity of unique subnets determined by subnet analyzer module 314 to a distribution threshold and generate a suspicious domain name alert if the number of unique subnets associated with a domain name exceeds the distribution threshold. For example, if the distribution threshold is five subnets for a domain name and the subnet analyzer module 314 has determined that a domain name is associated with six subnets, then address distribution module may send a suspicious domain name alert to other sensors on the network. In an embodiment, the suspicious domain name alert may include the suspect domain name, the IP addresses associated with the domain name, an identifier for the DNS server, an identifier for a DNS client, or a combination thereof. In some embodiments, address distribution module 316 may generate a suspicious domain name alert and send the alert to other sensors on the network through sensor interface 320. In an embodiment, address distribution module may store the suspicious domain name alert in DNS information database 312.

According to embodiments, botnet detection module 318 may be configured to compare a number that identifies the quantity of unique subnets determined by subnet analyzer module 314 to a detection threshold and generate a detected botnet alert if the number of unique subnets associated with a domain name exceeds the detection threshold. For example, if the detection threshold is eight subnets for a domain name and the subnet analyzer module 314 has determined that a domain name is associated with nine subnets, then address distribution module may send a detected botnet alert to other sensors on the network. In an embodiment, the detected botnet alert may include the domain name of the detected botnet, the IP addresses associated with the domain name, an identifier for the DNS server, and an identifier for a DNS client. In some embodiments, botnet detection module 316 may generate a detected botnet alert and send the alert to other sensors on the network through sensor interface 320. In an embodiment, botnet detection module 318 may store the detected botnet alert in DNS information database 312.

In an embodiment, botnet detection sensor 300 may include sensor input/output interface 320. Sensor interface 320 may be configured to transmit DNS information and alerts to other sensors on the network, according to embodiments. In some embodiments, sensor interface 320 may be configured to receive DNS information and alerts from other sensors on the network. For example, when address distribution module 316 and botnet detection module 318 generate alerts, the alerts may be transmitted to other sensors through sensor interface 320. Also, when alerts, such as suspicious domain name alerts and detected botnet alerts, are sent by other sensors, the alerts may be received by detection sensor 300 via sensor interface 320. According to embodiments, when sensor interface 320 receives alerts or DNS information from other sensors, sensor interface 320 may be configured to store the alerts and DNS information in DNS information database 312.

According to some embodiments, collector 132 may communicate with sensor 300 through sensor interface 320. Collector 132 may receive information such as alerts and DNS information from sensor 300 via interface 320, according to embodiments. In an embodiment, collector 132 may provide configuration or other input to sensor 300 through interface 320. For example, when sensor 300 determines that a domain name belongs to a botnet, collector 132 override the determination and may send a message to sensor 300 that identifies the domain name as a safe domain name. In response to receiving the input from collector 132, sensor 300 may change the classification of the domain name and no longer identify the domain name as belonging to a botnet. In some embodiments, collector 132 may send to sensor 300 a white list of safe domain names and IP addresses so that sensor 300 can compare domain names to the white list and accurately identify botnets and malicious websites. Collector 132 may provide updated white list information periodically via interface 320, according to embodiments.

Botnet detection sensor 300 may include DNS packet filter 322, according to embodiments. In an embodiment, DNS packet filter 322 may be configured to query database 312 for domain names that have been identified as belonging to botnets or malicious websites. For example, botnet detection sensor 300 or another sensor on the network may have identified one or more domain names as belonging to a botnet. One or more detected botnet alerts may have been generated and stored in DNS information database 312 by sensor 300, according to embodiments. In an embodiment, one or more detected botnet alerts may have been received from other sensors via sensor interface 320 and stored in database 312. According to embodiments, once DNS packet filter 322 has retrieved a list of botnet domain names from database 312, filter 322 may monitor the DNS packets transmitted through packet processing module 304 in order to identify packets that include DNS information associated with any of the botnet domain names. In an embodiment, DNS packet filter 322 may cause packet processing module 304 to drop or discontinue transmitting DNS packets that include DNS information associated with one or more of the botnet domain names. Thus, DNS clients may be protected from accessing websites and servers under the control of botnets and malicious websites.

Botnet detection sensor 300 is an example of a sensor implemented as a network device. However, the botnet detection sensors described herein are not limited to a hardware implementation and in some embodiments a botnet detection sensor may be implemented as a process executed on a network device or other hardware. Moreover, although embodiments are described herein in the context of detecting botnets on routers or switches, the approach is not limited to this context and the approach may be implemented in other network elements. In addition, the approach may be implemented external to any network, so long as access to DNS information is available.

4.0 Implementation Mechanisms—Hardware Overview

Figure 4:
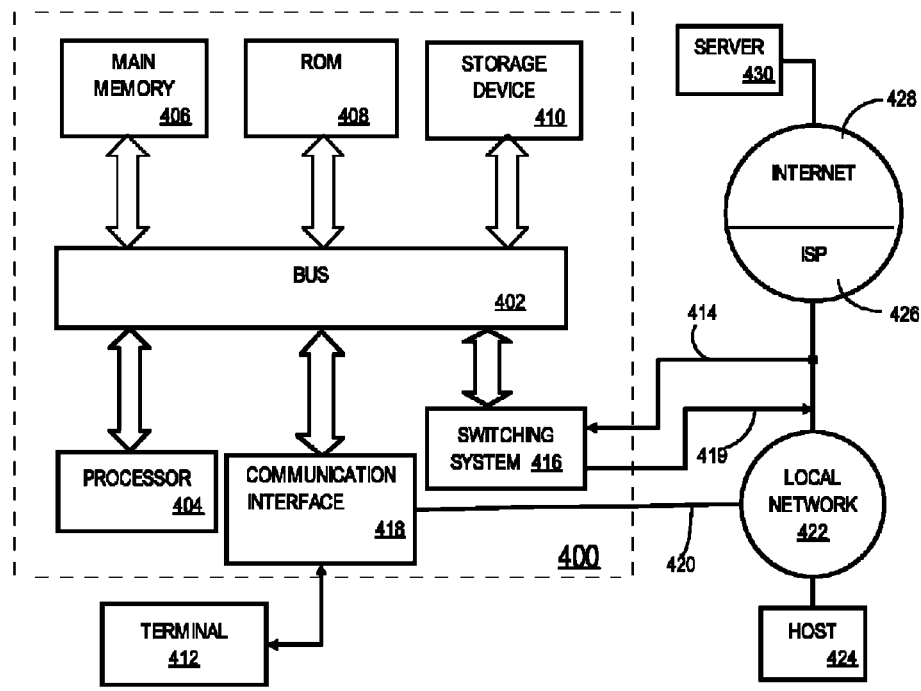
FIG. 4 illustrates a computer system upon which an embodiment may be implemented.

FIG. 4 is a block diagram that illustrates a computer system 400 upon which an embodiment of the invention may be implemented. The preferred embodiment is implemented using one or more computer programs running on a network element such as a router device. Thus, in this embodiment, the computer system 400 is a router.

Computer system 400 includes a bus 402 or other communication mechanism for communicating information, and a processor 404 coupled with bus 402 for processing information. Computer system 400 also includes a main memory 406, such as a random access memory (RAM), flash memory, or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk, flash memory or optical disk, is provided and coupled to bus 402 for storing information and instructions.

A communication interface 418 may be coupled to bus 402 for communicating information and command selections to processor 404. Interface 418 is a conventional serial interface such as an RS-232 or RS-422 interface. An external terminal 412 or other computer system connects to the computer system 400 and provides commands to it using the interface 418. Firmware or software running in the computer system 400 provides a terminal interface or character-based command interface so that external commands can be given to the computer system.

A switching system 416 is coupled to bus 402 and has an input interface 414 and an output interface 419 to one or more external network elements. The external network elements may include a local network 422 coupled to one or more hosts 424, or a global network such as Internet 428 having one or more servers 430. The switching system 416 switches information traffic arriving on input interface 414 to output interface 419 according to pre-determined protocols and conventions that are well known. For example, switching system 416, in cooperation with processor 404, can determine a destination of a packet of data arriving on input interface 414 and send it to the correct destination using output interface 419. The destinations may include host 424, server 430, other end stations, or other routing and switching devices in local network 422 or Internet 428.

The invention is related to the use of computer system 400 for detecting botnets. According to one embodiment of the invention, detection of botnets is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile storage media, volatile storage media, and transmission media. Non-volatile storage media includes, for example, optical or magnetic disks, such as storage device 410. Volatile storage media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of computer-readable storage media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other tangible storage medium from which a computer can read.

Various forms of computer readable storage media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406, from which processor 404 retrieves and executes the instructions. The instructions received by main memory 406 may optionally be stored on storage device 410 either before or after execution by processor 404.

Communication interface 418 also provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for detecting botnets as described herein.

The received code may be executed by processor 404 as it is received, and/or stored in storage device 410, or other non-volatile storage for later execution. In this manner, computer system 400 may obtain application code in the form of a carrier wave.

5.0 Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
    receiving, at a first sensor, first domain name system (DNS) information including one or more first internet protocol (IP) addresses corresponding to a first domain name;
    determining a first number of unique subnets which are based on the one or more first IP addresses and which are unique in all subnet classes;
    sending, to one or more other sensors, a first alert that includes the first DNS information when the first number of unique subnets exceeds a first threshold;
    wherein the method is performed by one or more processors.

2. The method of claim 1, further comprising:
    receiving, at the first sensor, second DNS information including one or more second IP addresses corresponding to a second domain name;
    determining a second number of unique subnets based on the one or more IP addresses;
    sending, to one or more computing devices, a second alert that identifies the second domain name as corresponding to a malicious entity when the second number of unique subnets exceeds a second threshold that is different than the first threshold.

3. The method of claim 2, further comprising receiving at least part of the first DNS information or second DNS information from at least one of the other sensors.

4. The method of claim 1, further comprising:
    applying a subnet mask to the one or more first IP addresses to generate one or more subnet identifiers;
    determining the first number of unique subnets based on the one or more subnet identifiers.

5. The method of claim 4, further comprising performing a hash operation on the one or more subnet identifiers to determine a first number of unique subnet identifiers.

6. The method of claim 1, wherein the first threshold is less than a second threshold.

7. The method of claim 1, further comprising:
    storing the first DNS information in a DNS information database;
    retrieving one or more stored IP addresses from the DNS information database;
    determining the first number of unique subnets based on the one or more stored IP addresses retrieved from the DNS information database.

8. The method of claim 1, further comprising:
    intercepting, at the first sensor, one or more DNS records sent from a DNS server to a DNS client device;
    parsing the DNS records to determine the one or more first IP addresses corresponding to the first domain name;
    sending the one or more DNS records to the DNS client device.

9. The method of claim 1, wherein the first sensor is a router or a switch.

10. A non-transitory computer-readable medium storing one or more sequences of instructions that, when executed by one or more processors, causes the processors to perform:
    receiving, at a first sensor, first domain name system (DNS) information including one or more first internet protocol (IP) addresses corresponding to a first domain name;
    determining a first number of unique subnets which are based on the one or more first IP addresses and which are unique in all subnet classes;
    sending, to one or more other sensors, a first alert that includes the first DNS information when the first number of unique subnets exceeds a first threshold.

11. The computer-readable medium of claim 10, wherein the instructions comprise instructions that cause:
    receiving, at the first sensor, second DNS information including one or more second IP addresses corresponding to a second domain name;
    determining a second number of unique subnets based on the one or more IP addresses;
    sending, to one or more computing devices, a second alert that identifies the second domain name as corresponding to a malicious entity when the second number of unique subnets exceeds a second threshold that is different than the first threshold.

12. The computer-readable medium of claim 11, wherein the instructions comprise instructions that cause receiving at least part of the first DNS information or second DNS information from at least one of the other sensors.

13. The computer-readable medium of claim 10, wherein the instructions comprise instructions that cause:
    applying a subnet mask to the one or more first IP addresses to generate one or more subnet identifiers;
    determining the first number of unique subnets based on the one or more subnet identifiers.

14. The computer-readable medium of claim 13, wherein the instructions comprise instructions that cause performing a hash operation on the one or more subnet identifiers to determine a first number of unique subnet identifiers.

15. The computer-readable medium of claim 10, wherein the first threshold is less than a second threshold.

16. The computer-readable medium of claim 10, wherein the instructions comprise instructions that cause:
    storing the first DNS information in a DNS information database;
    retrieving one or more stored IP addresses from the DNS information database;
    determining the first number of unique subnets based on the one or more stored IP addresses retrieved from the DNS information database.

17. The computer-readable medium of claim 10, wherein the instructions comprise instructions that cause:
    intercepting, at the first sensor, one or more DNS records sent from a DNS server to a DNS client device;
    parsing the DNS records to determine the one or more first IP addresses corresponding to the first domain name;
    sending the one or more DNS records to the DNS client device.

18. The computer-readable medium of claim 10, wherein the first sensor is a router or a switch.

19. An apparatus comprising:
    one or more processors;
    an information acquisition module configured to receive, at a first sensor, first domain name system (DNS) information including one or more first internet protocol (IP) addresses corresponding to a first domain name;
    a subnet analyzer module configured to determine a first number of unique subnets which are based on the one or more first IP addresses and which are unique in all subnet classes;
    an address distribution module configured to send, to one or more other sensors, a first alert that includes the first DNS information when the first number of unique subnets exceeds a first threshold.

20. The apparatus of claim 19, further comprising:
a sensor interface configured to receive, at the first sensor, second DNS information including one or more second IP addresses corresponding to a second domain name;
wherein the subnet analyzer module is configured to determine a second number of unique subnets based on the one or more IP addresses
a botnet detection module configured to send, to one or more computing devices, a second alert that identifies the second domain name as corresponding to a malicious entity when the second number of unique subnets exceeds a second threshold that is different than the first threshold.

21. The apparatus of claim 20, wherein at least part of the first DNS information or second DNS information is received from one or more other sensors.

22. The apparatus of claim 19, wherein the subnet analyzer module is configured to apply a subnet mask to the one or more first IP addresses to generate one or more subnet identifiers and determine the first number of unique subnets based on the one or more subnet identifiers.

23. The apparatus of claim 22, wherein the subnet analyzer module is configured to perform a hash operation on the one or more subnet identifiers to determine a first number of unique subnet identifiers.

24. The apparatus of claim 20, further comprising:
a DNS information database configured to store the first DNS information and the second DNS information;
wherein the subnet analyzer module is configured to retrieve one or more stored IP addresses from the DNS information database and determine the second number of unique subnets based on one or more stored IP addresses retrieved from the DNS information database.

* * * * *